United States Patent
Sick (10) Patent No.: US 6,846,128 B2
(45) Date of Patent: Jan. 25, 2005

(54) MOBILE SOIL COMPACTING DEVICE WHOSE DIRECTION OF TRAVEL IS STABILIZED

(75) Inventor: Georg Sick, Feldafing (DE)

(73) Assignee: Wacker Construction Equipment AG, Munich (DE)

( * ) Notice: Subject to any disclaimer, the term of this patent is extended or adjusted under 35 U.S.C. 154(b) by 1 day.

(21) Appl. No.: 10/398,728

(22) PCT Filed: Oct. 11, 2001

(86) PCT No.: PCT/EP01/11793

§ 371 (c)(1),
(2), (4) Date: Apr. 8, 2003

(87) PCT Pub. No.: WO02/35005

PCT Pub. Date: May 2, 2002

(65) Prior Publication Data

US 2004/0022582 A1 Feb. 5, 2004

(30) Foreign Application Priority Data

Oct. 27, 2000 (DE) .......................... 100 53 446

(51) Int. Cl.$^7$ .......................... E01C 19/38; E02D 3/074
(52) U.S. Cl. .............................. 404/133.05; 404/84.05
(58) Field of Search .................... 404/133.05, 133.1, 404/133.2, 122, 84.05, 84.1

(56) References Cited

U.S. PATENT DOCUMENTS

| | | | | |
|---|---|---|---|---|
| 3,599,543 A | * | 8/1971 | Kerridge | 404/117 |
| 4,348,901 A | * | 9/1982 | Vural et al. | 73/594 |
| 5,164,641 A | * | 11/1992 | Quibel et al. | 318/128 |
| 5,356,238 A | * | 10/1994 | Musil et al. | 404/84.1 |
| 5,401,115 A | * | 3/1995 | Musil et al. | 404/72 |
| 5,695,298 A | * | 12/1997 | Sandstrom | 404/72 |
| 5,727,900 A | * | 3/1998 | Sandstrom | 404/84.1 |
| 5,942,679 A | * | 8/1999 | Sandstrom | 73/78 |
| 6,113,309 A | | 9/2000 | Hollon et al. | |
| 6,236,923 B1 | * | 5/2001 | Corcoran et al. | 701/50 |
| 6,558,072 B2 | * | 5/2003 | Staffenhagen et al. | 404/117 |
| 2003/0047003 A1 | * | 3/2003 | Miyamoto et al. | 73/660 |

FOREIGN PATENT DOCUMENTS

| | | |
|---|---|---|
| DE | 944922 | 1/1959 |
| DE | 1213255 | 8/1961 |
| WO | WO 00/56984 | 9/2000 |

* cited by examiner

*Primary Examiner*—Robert E. Pezzuto
*Assistant Examiner*—Alexandra K. Pechhold
(74) *Attorney, Agent, or Firm*—Boyle Fredrickson Newholm Stein & Gratz S.C.

(57) ABSTRACT

The invention relates to a soil compacting device comprising a motion detection device for detecting an actual value for the travelling motion of the soil compacting device. Inside a travel control device, the actual value is compared with a set value that is predetermined by the operator. When a difference between these two values is determined, the travel control device corrects the travelling motion by controlling a steering device or a drive of the soil compacting device. In another embodiment of the invention, a number of vibration plates are connected by the means of connecting elements to form a soil compacting system, which is also provided with a travel control device. The travel control device controls the individual drives in order to steer the entire soil compacting system.

22 Claims, 6 Drawing Sheets

MOBILE SOIL COMPACTING DEVICE WHOSE DIRECTION OF TRAVEL IS STABILIZED

BACKGROUND OF THE INVENTION

1. Field of the Invention

The invention relates respectively to a driveable ground-compaction device and a ground-compaction system having several driveable ground-compaction devices.

2. Description of the Related Art

Ground-compaction devices are known inter alia in the form of remote-controllable vibration plates, in which an oscillation or unbalance exciter not only produces the vertical oscillation of the plate as required for ground-compaction purposes but also effects propulsion by means of suitable adjustment facilities in the oscillation exciter. The steering capability is achieved by the generation of directed oscillations outside a vertical axis of the vibration plate. Vibration plates of this type typically comprise two parallel unbalanced shafts which rotate in opposite directions (hence the term "dual-shaft exciters"), wherein one of the shafts supports two axially disposed unbalanced masses which can be adjusted independently of each other in their relative phase position. The sum of the m·r values (m=unbalanced mass, r=eccentricity of the centre of gravity of the unbalanced mass) of these unbalanced masses corresponds to the m·r value of the second exciter shaft which likewise supports an unbalanced mass but rotates in the opposite direction. By appropriately synchronising the phase angles of the three unbalanced masses it is possible to produce oscillations directed in a known manner. This type of oscillation exciter is known from DE-G 78 18 542.9.

If the resulting force vector of the oscillations are forwardly inclined in the direction of travel of the vibration plate, the machine will be accelerated forwards. When negotiating a turn to the left, the left-hand unbalanced mass of the shaft, which supports the two unbalanced masses, is synchronised with the large unbalanced mass of the other shaft in such a manner that the force vector resulting from the three rotating unbalanced masses generates a turning moment (yawing moment) about the vertical axis of the vibration plate. Appropriate synchronisation of the unbalanced masses also renders it possible to adjust any so-called standing vibration, in which the resulting force vector is directed in a vertical direction. Accordingly, it is also possible to carry out reverse travel or rotation of the vibration plate in a standing position.

The vibration plate is controlled typically by means of electromechanical or electrohydraulic actuators for the relative rotation of the unbalanced masses which actuators are actuated by means of radio, infrared or cable remote-control.

By reason of the tumbling jumping movement of the vibration plate dragging partly on the ground during the vibration operation, constantly changing forces and turning moments are transmitted to the driveable vibration plate depending upon the condition of the ground and the coefficient of friction between the plate and the ground. A low constancy of direction during operation of the vibration plate results, so that in short time intervals the operator is required to correct the direction of movement, in order to prevent the vibration plate from swerving. To this end, it is conventional in the case of remote-controlled vibration plates to stop the vibration plate and whilst at a standstill to rotate it about the vertical axis by the generation of a maximum yawing moment. Although it is possible, in principle, to negotiate a turn, i.e. to generate a yawing moment during the simultaneous propulsive movement of the vibration plate, the low degree of directional stability makes this scarcely feasible in practice. The continuous alignment of the vibration plate requires the operator's utmost concentration.

OBJECTS AND SUMMARY OF THE INVENTION

It is the object of the invention to provide a ground-compaction device with improved stability in the direction of travel which in spite of unpredictable forces created by the ground enables the ground-compaction device to operate with constant directional stability or to perform a co-ordinated turning movement.

In accordance with the invention the object is achieved by means of a ground-compaction device having the features of claim 1. The inventive solution for the ground-compaction device can also be applied to a ground-compaction device, which is equipped with several oscillation exciters, and to a ground-compaction system which consists of several ground-compaction devices and is defined in claim 16. Advantageous developments of the invention are provided in the dependent claims.

The ground-compaction device in accordance with the invention comprises a movement detection device for the purpose of detecting an actual value for the travel movement which includes an alignment, a direction of travel, a course over the ground, a rate of rotation and/or a travel speed of the ground-compaction device. The movement detection device renders it possible to establish the actual movement or alignment of the ground-compaction device as caused e.g. by ground unevenness or the condition of the ground.

The actual value which is output by the movement detection device is compared in a travel control device with a desired value which is specified by the operator by means of a travel transmitter. The travel control device actuates the steering device and/or the drive of the ground-compaction device so as to minimize the difference between the actual value and the desired value, i.e. a control deviation. This means that the movement detection device can be used to register directly any changes in direction which are brought about by ground effects or by the tumbling movement of the vibration plate, so that the travel control device is able to perform a corresponding counter-correction and then adjust the ground-compaction device to perform the travel movement, e.g. a course over the ground, as required by the operator and specified in the form of a desired value. As a consequence, the ground-compaction device is able to operate with constant directional stability even on inclined or uneven ground surface. Furthermore, it is possible to perform a co-ordinated turning movement with the simultaneous rotation and forwards movement according to the requirements of the operator, without the operator permanently having to intervene in a corrective manner using the travel transmitter.

The term "travel movement" is used in conjunction with the invention as a generic term for a multiplicity of individual physical variables which in the broadest sense relate to the movement of the ground-compaction device: The term "alignment" is used to refer to a position of the ground-compaction machine in an inertial system or over the ground. The term "travel direction" is used to refer to the movement direction of the ground-compaction device in an inertial system, e.g. the earth's magnetic field. The term "course over the ground" differs from this and relates to the actual movement of the ground-compaction device over the ground which is to be compacted. For example, a ground-compaction device can be aligned in the north-west direction but the drive action generated by means of the oscillation exciter will cause it to assume a travel direction at an angle thereto, namely to the west.

If the movement of the ground-compaction device is then disrupted e.g. by means of an inclined ground surface or by ground unevenness, it is possible, however, for the direction of travel of the ground-compaction device to be directed constantly in a westerly direction, but the impact shocks produced by the unevenness in the ground will cause it to be displaced laterally in each case. As a consequence, the resulting course over the ground deviates from the set direction of travel.

In the case of an advantageous embodiment of the invention, given a corresponding requirement of the operator the travel control device is able to actuate the steering device and/or the drive in such a manner that the ground-compaction device is moved progressively at maximum speed with minimal control deviation, i.e. with the greatest possible degree of directional constancy. This means that even when performing turns it is possible for the ground-compaction device to achieve high travel speeds.

Suitable movement detection devices include commercially available yawing rate sensors, gyro compasses, optical fiber gyroscopes, earth's magnetic field sensors, GPS-receivers (GPS: Global Positioning System) or acceleration sensors and suitable combinations of the said elements.

Depending upon the outlay in configuring the movement detection device and the control algorithms in the travel control device, it is possible to adjust different types of control behaviour: In a relatively simple case of control, a gyro compass is provided which by means of an associated control attempts to counteract a rotation, which is caused by a disturbance, about the yawing axis of the ground-compaction device. However, if the rotation produced by the external effect is excessive, the control is overridden and a permanent control deviation is set. However, for a more complicated control it is possible for the movement detection device to establish and control a deviation in the direction of travel. This means that the ground-compaction device is always moved in the same direction. However, it is not thereby possible to correct a parallel displacement of the ground-compaction device as caused by an external effect. In contrast, an even more complicated control technique borrowed from the aircraft construction industry even registers deviations from the specified course over the ground and is not only able to keep the direction of travel constant or to counter-steer appropriately after deviations have occurred, but is also able to correct a parallel displacement and to return the machine to the original course.

The technical doctrine forming the basis of the invention can be utilised in a particularly advantageous manner in the case of a ground-compaction device which comprises several oscillation exciter systems, since the turning moments, e.g. about the vertical axis of the ground-compaction device can be controlled in accordance with the invention sensitively and directly according to the requirements for stabilising the direction of travel. Therefore, it is also possible to use combinations of oscillation exciters and their directions of propulsion which by reason of the directional instability of the entire system could not be governed under manual control, i.e. without the detection and evaluation of the travel movement. Moreover, it is possible to utilise simply constructed oscillation exciters, e.g. consisting of a pair of counter-rotating unbalanced masses with a resulting force vector which can be adjusted about the transverse axis of the exciter.

Preferably, the oscillation exciter systems are to be arranged so that their directions of propulsion extend in parallel. Directional control is performed via the alignment of the force vectors about the transverse axis of the exciter, whereby a turning moment is executed about the vertical axis of the compaction device.

Alternatively, oscillation exciter systems in which the rotational frequency, i.e. the rotational speed of the rotating unbalanced shafts can be adjusted, e.g. by way of hydraulic proportional valves, are also suitable. Changing the rotational speed of the unbalanced shafts causes the resulting centrifugal force to change, so that the desired force effects can be adjusted.

In the case of a different embodiment, the direction of propulsion of at least one of the oscillation exciter systems differs from the direction of propulsion of at least one other oscillation system. The oscillation exciter systems can generate oscillations with or without synchronisation.

In the case of an arrangement of the oscillation exciter devices which is perpendicular in relation to the directions of propulsion, e.g. an exciter system is used for the forwards and reverse travel of the ground-compaction device and the second exciter system is used for directional control. During undisrupted travel in a straight-line, the resulting force vector of the exciter system provided for directional control is aligned perpendicular with respect to the plane, i.e. without a direction of propulsion. As an alternative to this, the force vector can also be directed in a controlled oscillating manner to the left and the right, in order to introduce e.g. thrust stresses into the material to be compacted.

In one particular embodiment of the invention, two synchronised oscillation exciter systems are disposed in the ground-compaction device one above the other with mutually perpendicular directions of propulsion. By suitably actuating the two oscillation exciter systems, it is possible to align the resulting force vector in any manner about the vertical axis of the ground-compaction device. In a further advantageous embodiment, the resulting force vector can be effective in the centre of gravity of the ground-compaction device. In conjunction with the directional stabilisation and e.g. a ground-contact plate having a circular outline it is possible in the case of this embodiment to achieve a particularly high degree of directional stability and manoeuvrability of the ground-compaction device.

In the case of a ground-compaction system in accordance with the invention, several ground-compaction devices can be operated connected together rigidly and elastically. As in the case of above-described individual ground-compaction device, a movement detection device is provided for the purpose of detecting an actual value for the travel movement of the entire ground-compaction system, which actual value is compared in a travel control device with a desired value specified by the operator. The travel control device actuates the individual drives of the respective ground-compaction devices so as to minimize the difference between the actual value and the desired value. In this manner, it is possible to combine several ground-compaction devices to form one unit, which allows for considerably greater working power. The travel control device ensures that the entire complex system also remains readily governable and controllable for the operator.

This means as a result that none of the ground-compaction devices requires its own steering device. On the contrary, in the case of the system consisting of several ground-compaction devices, it is possible to adjust the travel speed and the direction of travel, i.e. the travel movement of the entire system by actuating the respective drives which generate the individual propulsion of the associated ground-compaction devices. By reason of the fact that the actual travel movement is detected on a permanent basis, the travel control device directly controls any deviations from the operator's requirement, so that constant and co-ordinated movement is achieved.

In the case of a preferred embodiment of the invention, the ground-compaction devices are held by a connection structure in such a manner that the directions of propulsion of the individual ground-compaction devices are disposed in parallel. A moment, which is required for the purpose of effecting a change in direction, about the vertical axis of the composite structure is generated by actuating the individual oscillation exciters.

In the case of a different embodiment of the invention, the direction of propulsion of at least one of the ground-compaction devices differs from the direction of propulsion of at least one other ground-compaction device. By actuating the individual drives which are suitably disposed for the purpose of generating the propulsion and the directional stabilisation, it is possible for the entire ground compaction system to move progressively in a stabilised manner with respect to direction or course.

BRIEF DESCRIPTION OF THE DRAWINGS

These and further advantages and features of the invention will be explained in detail herein under with reference to examples and with the aid of the accompanying Figures, in which.

DETAILED DESCRIPTION OF THE PREFERRED EMBODIMENTS

Figure 1:
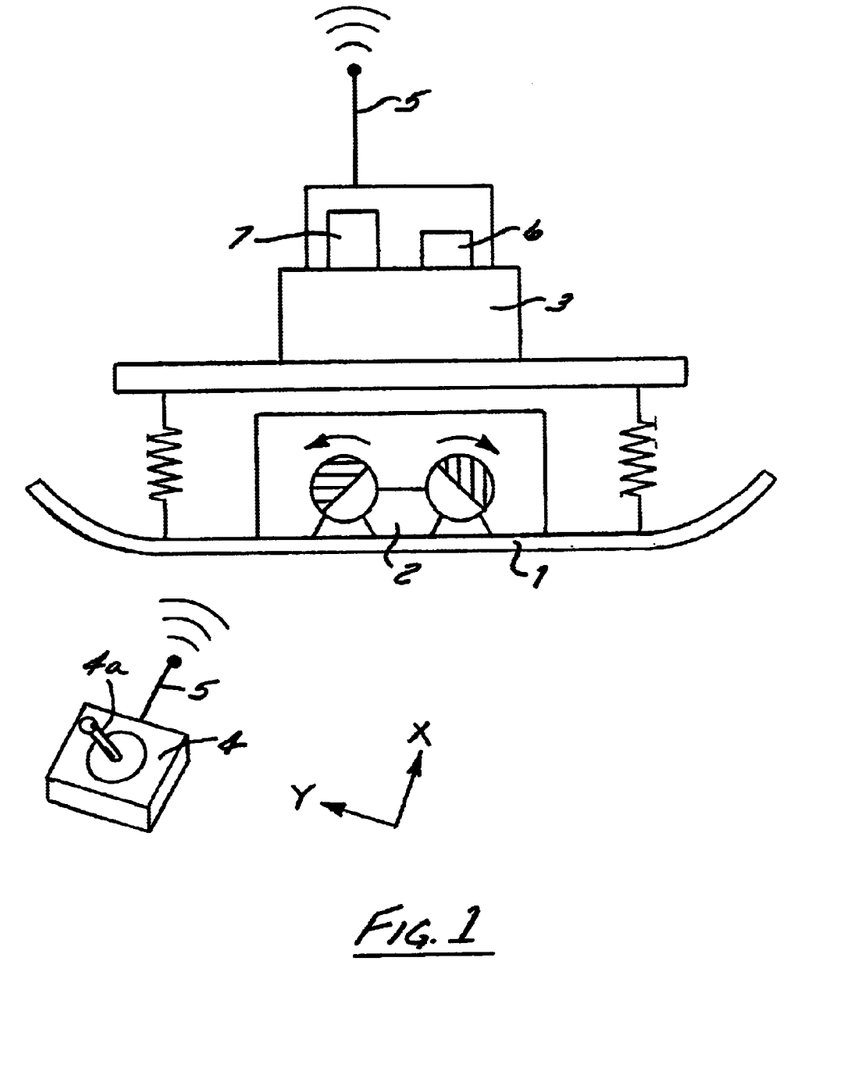
FIG. 1 shows a schematic lateral view of a remote-controllable ground-compaction device in accordance with the invention.

The invention will be explained with reference to a remote-controllable vibration plate which is illustrated in FIG. 1 and is used as a ground-compaction device. However, the invention can also be applied to different ground-compaction devices, such as e.g. rollers or non-remote-controlled vibration plates.

The vibration plate comprises a ground-contact plate 1, on which there is mounted, as already explained above with reference to the prior art, a dual-shaft oscillation exciter 2 which serves as an oscillation excitation device and whose second shaft supports two unbalanced masses which can be adjusted in phase position independently of each other. The dual-shaft oscillation exciter 2 is driven in a known manner by a motor 3. The oscillation excitation device, i.e. the dual-shaft oscillation exciter 2 simultaneously serves as a drive and as a steering device, so that the propulsion required to generate the travel speed, the forwards and reverse movement and a turning moment about the vertical axis of the vibration plate is generated by means of the dual-shaft oscillation exciter 2.

The vibration plate is operator-actuated by means of radio, infrared or cable via a remote-control 4 which serves as a travel transmitter and comprises a so-called joystick 4a. For this purpose, the operator carries a control box, on which is disposed the joystick 4a, a type of control lever, which can be moved in the X- and Y-direction. A deflection of the joystick 4a in the X-direction effects forwards travel of the vibration plate, whereas a deflection of the joystick 4a in the positive or negative Y-direction effects a corresponding rotation of the vibration plate to the left or to the right. The rotational signal can also be a specification for the rate of rotation of the vibration plate or for an intended radius of curvature. In order to control the vibration plate, it is of course possible to use any other type of remote control in addition to the remote control 4 illustrated, e.g. a control device mounted directly on the vibration plate.

In the example shown in FIG. 1, a control signal which is generated by the remote-control 4 is transmitted via antennas 5 to the vibration plate, where it is evaluated for the purpose of adjusting the travel speed, the direction of travel and, where appropriate, the steering.

The steering action, i.e. primarily the generation of a yawing moment about the vertical axis of the vibration plate, is likewise performed by the oscillation excitation device which is this case is also used as a steering device. Therefore, in the case of the vibration plate as shown in FIG. 1, the oscillation excitation device forms the drive and the steering device at the same time. However, in the case of different embodiments of the invention, the functions can also be taken on by separately constructed and separately operable devices.

The actual travel movement of the vibration plate which is dependent upon the effect of the oscillation exciter and also upon external influences, e.g. upon the friction on the ground and which is made up of the travel speed and the direction of travel is determined by means of a movement detection device 6. Depending upon the particular application, a suitable movement detection device 6 can be yawing rate sensors for detecting the rotation about the vertical axis of the vibration plate, gyro compasses or optical fiber gyroscopes for detecting changes in direction in relation to an inertial system, earth's magnetic field sensors for determining the relative position of the vibration plate in the earth's magnetic field, GPS-receivers or acceleration sensors. In order to enhance the measuring precision, it is frequently expedient to combine several of these devices to form one movement detection device 6. For example, it is also possible to utilise movement detection devices for navigation systems from the field of automotive and aircraft construction.

In addition to determining the travel speed and the direction of travel, it can also be expedient to determine the rate of rotation about the vertical axis of the vibration plate or to determine the alignment of the vibration plate in relation to an inertial system.

A signal which is generated by the movement detection device 6 and corresponds to the actual value for the travel movement is fed to a travel control device 7 which is also influenced by the desired value signal from the remote-control 4. The travel control device 7 forms a difference, corresponding to a control deviation, between the actual value and the desired value. With the aid of suitable control algorithms which are to be designed by the person skilled in the art in accordance with the intrinsic behaviour of the vibration plate, the travel control device 7 actuates the oscillation exciter 2, i.e. the drive and the steering device in such a manner as to minimize the control deviation. As a consequence, the vibration plate is held with a high level of precision on the course desired by the operator.

In the event that the movement detection device 6 provides actual values with respect to a rotational rate of the vibration plate or with respect to the alignment thereof, it is also possible to compare these actual values with corresponding desired values. Therefore, it is possible to adjust the position of the vibration plate, for example, whilst at a standstill, i.e. strictly speaking there is no direction of travel and travel speed is zero.

Figure 2A:
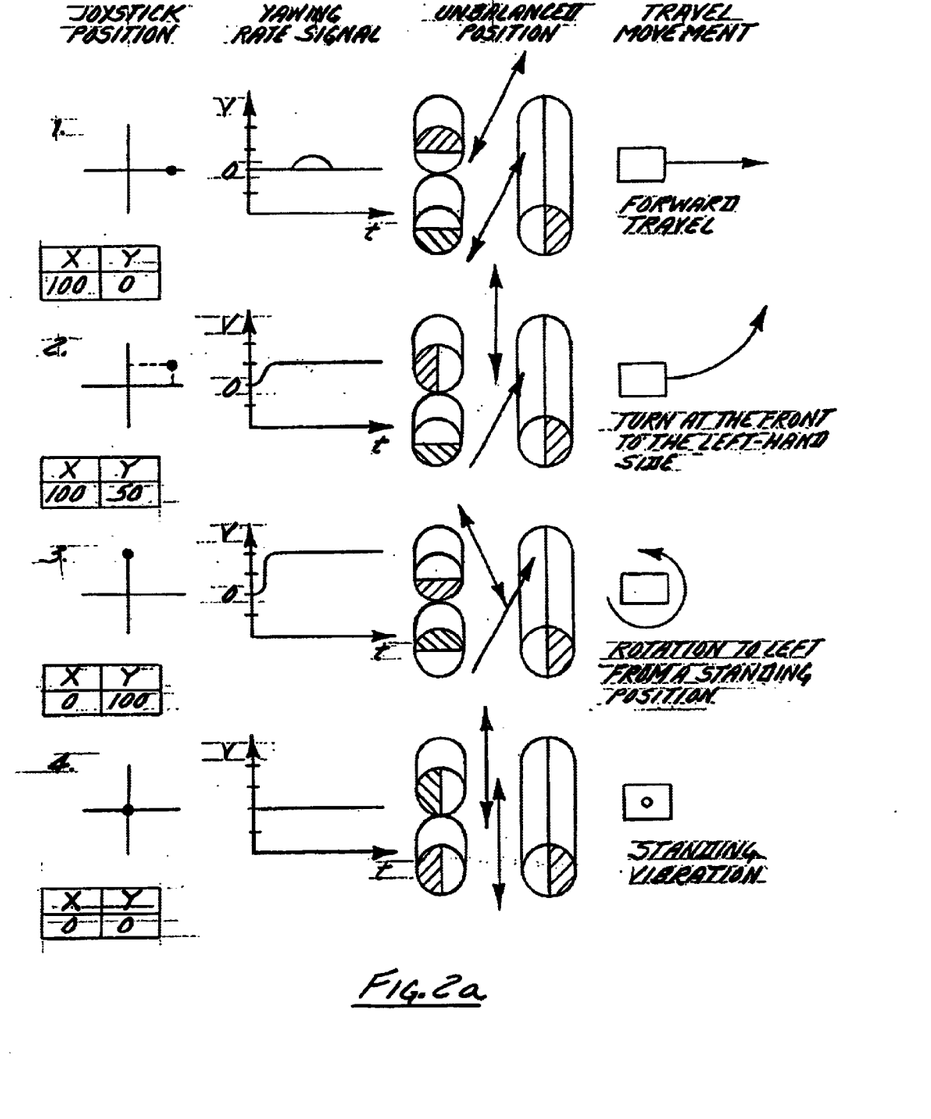
FIGS. 2a and 2b show in tabular form the connections between a travel transmitter position, an actual value of a movement detection device, a position of an oscillation exciter and a resulting travel movement in the case of a ground-compaction device in accordance with the invention in different operational states.
Figure 2B:
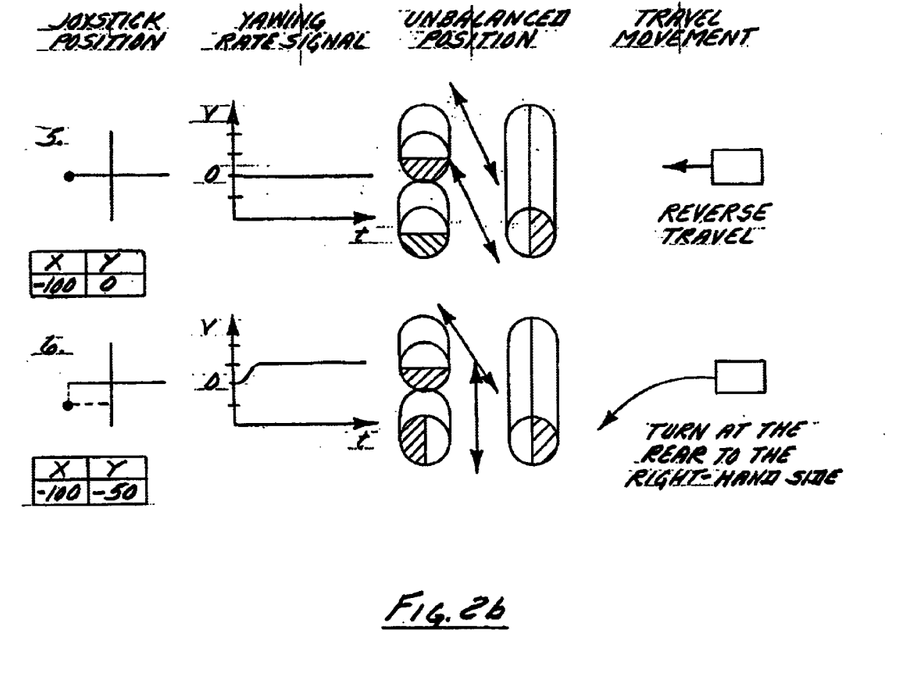

FIGS. 2*a* and 2*b* illustrate in tabular form examples of the interaction of the essential components of the vibration plates in conjunction with different operational states. The columns of the table compare the joystick position, i.e. the position of the joystick 4*a* on the remote-control 4, a yawing rate signal as a representation of an actual value provided by the movement detection device 6, the position of the unbalanced masses in the oscillation exciter 2 and the resulting travel movement of the vibration plate.

The oscillation exciter 2 corresponds to the dual-shaft oscillation exciter described above, in which two shafts can be rotated in opposite directions but in synchronism and support unbalanced masses in each case. On one of the shafts (on the left-hand side in FIG. 2*a*-1) the unbalanced mass is divided up into two axially disposed partial masses which, despite rotating together on the associated shaft, can be adjusted in their phase position with respect to each other, as is evident by a comparison between FIG. 2*a*-1 and FIG. 2*a*-2.

Also illustrated in addition to the unbalanced masses are the resulting force vectors which are produced between the unbalanced mass of the one (right-hand) shaft and the respective other (left-hand) partial mass.

In FIG. 2*a*-1 the unbalanced masses are synchronised in the oscillation excitation device in such a manner as to be able to achieve maximum propulsion and thus maximum forwards speed of the vibration plate. The resulting force vectors are thus forwardly inclined at an angle of about 45°.

This unbalanced position is effected by means of the joystick 4*a* which provides a maximum X-value (in this case: 100).

As long as the plate is constantly moving forwards, the yawing rate signal remains at a constant value, e.g. at zero, since the vibration plate does not rotate about its vertical axis. For the purpose of explaining the progression of the yawing rate signal, it is assumed that the yawing rate signal is a voltage, the progression of which is illustrated over time.

As an example, FIG. 2*a*-1 also illustrates the case of a disturbance, e.g. by reason of ground unevenness. The yawing rate signal falls away (broken line), because the vibration plate performs a slight rotation. An increasing deviation between the desired value, which is specified by the joystick position, and the actual value is identified immediately by the travel control device 7 and is corrected by influencing the unbalanced positions and thus the resulting force vectors with the aim of keeping the yawing rate signal at zero.

Nevertheless, if a change in direction occurs, e.g. because the external disturbance is excessive, a rotational rate thus becomes effective over a specific period of time or exceeds a limit value, then with the application of a suitable control principle it is possible for the vibration device to be rotated back to its initial direction of travel by generating an oppositely directed yawing moment which is effective over a corresponding period of time. The travel control device 7 is to be designed expediently such that it not only prevents rotation of the vibration plate when rotation is not required, but also allows a rotation caused by disruptive external influences to be compensated for by means of a counter-rotation.

FIG. 2*a*-2 illustrates a drive state, in which the vibration plate executes a turn at the front to the left-hand side.

By way of example, the joystick values are X=100 and Y=50, this means that the operator still requires maximum forwards travel and at the same time a left-rotation component, e.g. as a specification for a rotational rate. The unbalanced masses in the oscillation excitation device 2 accordingly generate two different resulting force vectors such that—as seen in the direction of travel—the force vector on the right-hand side still has a forwards component, whereas the force vector on the left-hand side is merely directed vertically, i.e. is used exclusively for ground-compaction purposes but not for forwards travel.

The rotation of the vibration plate causes the yawing rate signal to increase and it then remains at a constant value if the rotation of the vibration plate is constant. The desired value for the yawing rate signal is then produced from the joystick position, so that the travel control device 7 is immediately able to control any possible deviations in the yawing rate signal by influencing the unbalanced position.

FIG. 2*a*-3 illustrates the case of a rotation of the vibration plate in a standing position to the left. The operator adjusts the joystick to the position X=0 and Y=100, as he/she does not require any travel speed but rather only a rotation of the vibration plate. For this purpose, the unbalanced masses generate resulting forces which are directed against each other, in order to effect maximum rotation. The yawing rate signal is kept accordingly at a maximum value.

FIG. 2*a*-4 illustrates the vibration plate vibrating in a standing position, in which the oscillation excitation device does not generate any propulsion but merely vertically directed oscillations. Since the vibration plate does not perform any rotation, the yawing rate signal is at zero.

FIG. 2*b*-5 illustrates the drive state, in which the operator sets complete reverse travel of the vibration plate by moving the joystick to the position X=−100. The unbalanced masses are moved to a position, in which resulting force vectors are generated with maximum propulsive effect in the reverse travel direction. Provided that the movement is not disrupted, the yawing rate signal remains at zero.

Finally, FIG. 2*b*-6 illustrates a state, in which the operator wishes to execute a turn at the rear to the right-hand side by moving the joystick to the position X=−100 and Y=−50. In this case, the yawing rate signal then increases to a positive value which as an example is to be equated in this case with a rotation of the vibration plate to the left—in relation to forwards travel.

As illustrated in the description above, it is sufficient if the joystick 4*a* outputs merely some predetermined values for the X- and Y-co-ordinates. Therefore, the signal values +100, 0, −100 are sufficient for the X-co-ordinates which determine the forwards or reverse travel direction. Several individual values, namely +100, +75, +50, +25, 0, −25, −50, −75 and −100, should be provided for the Y-co-ordinates which determine the direction of rotation.

In the description above, it has been assumed that the yawing rate signal is at 0 volts, if the vibration plate does not perform a rotation. The yawing rate signal lies in the range of a positive voltage, if the vibration plate performs a rotation to the left, whereas the signal value becomes negative in the event of a rotation to the right. Of course, these definitions only serve to illustrate the invention. In practice, it is also possible to achieve other values for the yawing rate signal. As set forth above, it is also possible, instead of determining the yawing rate signal, to determine a different signal or a combination of several signals as the actual value for the travel movement.

In the case of a different embodiment of the invention, in addition to measuring the yawing rate, a measurement of the advance speed is performed simultaneously e.g. by means of an additional sensor. As a consequence, the vibration plate is able to pass through specified radii of curvature, i.e. it simultaneously performs a rotation and a forwards movement and not only a specified rotation which in unfavourable conditions also lead to a standing rotation.

FIGS. 3a to e illustrate schematic plan views of ground-compaction devices in accordance with the invention comprising a different arrangement of several oscillation excitation devices.

In contrast to the vibration plate in accordance with the invention as shown in FIG. 1, each of the ground-compaction devices which are illustrated in FIGS. 3a to 3e and are also explained using the example of vibration plates is not provided with only one oscillation excitation device but rather with several oscillation excitation devices 10, 11, 12.

Figure 3A:
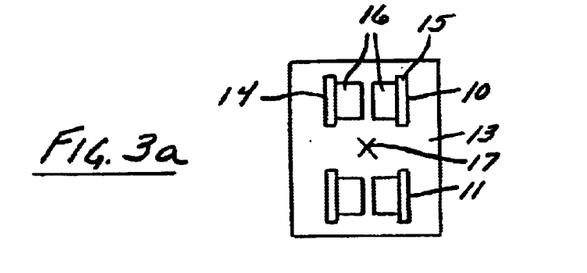
FIGS. 3a to 3e show a schematic plan view of oscillation exciter and propulsion combinations in the case of a ground-compaction device in accordance with the invention.

FIG. 3a schematically illustrates a vibration plate, in which two oscillation excitation devices 10, 11 are disposed in parallel with each other on a common ground-contact plate 13.

The oscillation excitation device 10, 11 is only illustrated in a schematic manner and consists in each case of two parallel shafts 14, 15 which are rotatably coupled together in a positive-locking manner and rotate in opposite directions and which each support an unbalanced mass 16 and are disposed in such a manner as to be adjustable in their relative phase position with respect to each other. Axial division of one of the unbalanced masses 16 on the associated shaft, as was the case in the in the embodiment as shown in FIGS. 1 and 2, is not required but is also fundamentally possible in the case of the vibration plates illustrated in FIGS. 3a to 3e.

The oscillation excitation devices 10, 11 are disposed in parallel with each other, so as to be effective in the same direction of propulsion. By adjusting different strength and differently directed resulting force vectors of the two oscillation excitation devices 10, 11, it is possible to generate a yawing moment about a vertical axis 17 thus making it possible to steer the vibration plate.

Figure 3B:
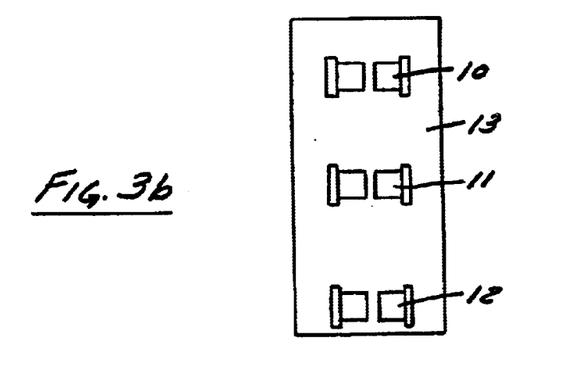
Figure 3C:
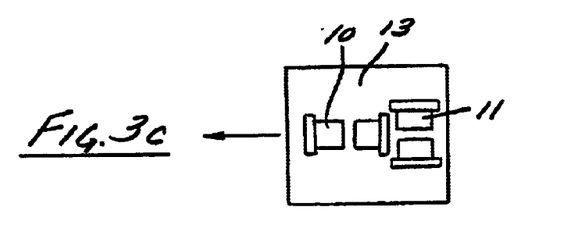
Figure 3D:
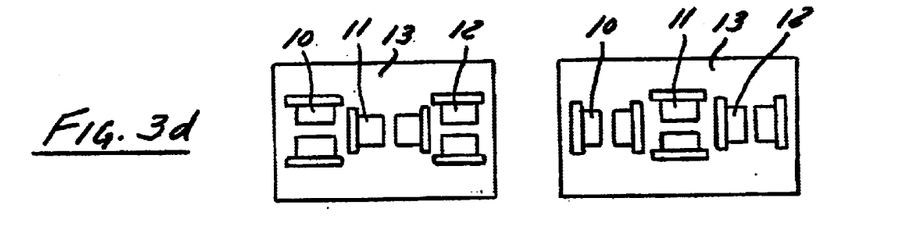

FIGS. 3b–3d illustrate variations of the vibration plate shown in FIG. 3a which could not be used in practice without the inventive stabilisation of the direction of travel.

Therefore, in the case of the embodiment as shown in FIG. 3b, three oscillation excitation devices 10, 11, 12 are disposed on the ground-contact plate 13. The middle one of the three oscillation excitation devices (designated by the reference numeral 11) does not automatically have to contribute to the propulsion and thus to the generation of a travel movement of the vibration plate. On the contrary, it is sufficient if only the outer oscillation excitation devices 10, 12 effect the propulsion and steering, whereas the middle oscillation excitation device 11 is used exclusively for the generation of a vertically directed oscillation. The middle oscillation excitation device 11 can be constructed in a correspondingly convenient manner. For example, it is therefore not necessary for the direction of the resulting force vector, which is generated by said oscillation excitation device, to be adjustable.

FIG. 3c illustrates an arrangement, in which the oscillation excitation devices 10, 11 are disposed rotated about 90° with respect to each other on the common ground-contact plate 13. The forwards travel movement of the vibration plate is illustrated by an arrow which is directed to the left. It is thus sufficient for normal forwards operation that only the oscillation excitation device 10 generates a forwardly directed force vector. Where the vibration plate does not have to be steered, the oscillation generated by the oscillation excitation device 11 is vertically directed. However, for steering purposes, the oscillation of the oscillation excitation device 11 can also be provided with a horizontal component, which effects a rotation of the vibration plate. By virtue of the continuous, oscillating change in direction of the horizontal component of the oscillation generated by the oscillation excitation device 11, it is possible to generate a serpentine movement of the vibration plate which serves to introduce thrust stresses into the ground to be compacted.

FIG. 3d illustrates two examples of the arrangement of three oscillation excitation devices 10, 11, 12, wherein in each case the middle oscillation excitation device 11 is offset by 90° with respect to the other oscillation excitation devices 10, 12.

In the case of all of the arrangements, in which at least one oscillation excitation device is offset by 90° with respect to the direction of propulsion of the vibration plate, it is possible during the compaction process for the vibration plate to perform not only steering movements but also a displacement in parallel with the main direction of travel. This is particularly advantageous for automating the process of compacting larger surfaces, wherein the surface can be compacted in parallel strips. It is namely possible to dispense with a complicated turning manoeuvre at the end of each strip, because the vibration plate must only be displaced in each case by the width of the ground-contact plate, which can be readily achieved by providing the oscillation excitation device 11 in a transverse position with respect to the main direction of propulsion.

Figure 3E:
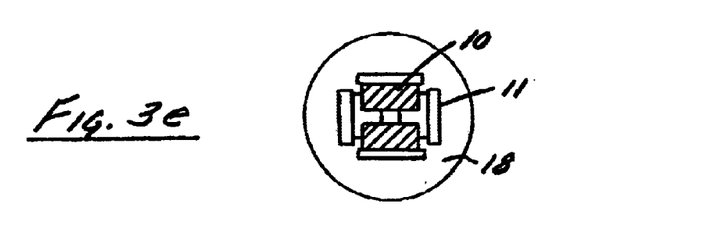

FIG. 3e shows a further embodiment of the invention, in which two oscillation excitation devices 10, 11 are disposed one above the other. The exciter axes are perpendicular with respect to each other. By suitably actuating the two oscillation excitation devices 10, 11, the resulting force vector can be aligned in any manner about the vertical axis of the vibration plate extending in the middle. In the present example, the resulting force vector acts in the centre of gravity of the vibration plate. Other points of engagement—depending upon the design of the vibration plate—can also be expedient.

In the example shown in FIG. 3e, the oscillation excitation devices 10, 11 are attached jointly on one ground-contact plate 18 which comprises a substantially circular outline. This type of vibration plate can be moved in a problem-free manner in all directions, without it being necessary to take an otherwise typical main direction into account. In conjunction with the above-described control of directional stabilisation, it is possible in this example to achieve a high degree of directional stability and manoeuvrability.

In conjunction with the inventive travel movement control, the ground-compaction devices illustrated in FIGS. 3a to 3e have the advantage over hitherto known vibration plates that without the use of the inventive travel control facility, the arrangements of oscillation excitation devices shown here by way of example would comprise a high degree of instability in the direction of travel, which as a result would constitute a considerable burden on the operator during practical handling, even in the case of hand-held, i.e. non-remote-controlled ground-compaction devices. In contrast, in conjunction with the inventive travel control device it is possible, even in the case of oscillation excitation device shafts which rotate at different frequencies, to control e.g. directional stability required by the operator as constantly as turning moments about the vertical axis generated by ground conditions are compensated.

It is obvious that instead of the two of three oscillation excitation devices shown in FIGS. 3a to 3e, even more oscillation excitation devices can be mounted on the common ground-contact plate and can be actuated—at least partially—by the travel control device.

FIGS. 4a to 4d show in schematic plan views ground-compaction systems in accordance with the invention which consist in each case of several vibration plates 21, 22, 23 and are connected together by means of a connection structure in a directionally stable manner, in such a way as to be height-adjustable relative to one another and, where appropriate, also in an elastic manner or movably with multiple degrees of freedom.

Figure 4A:
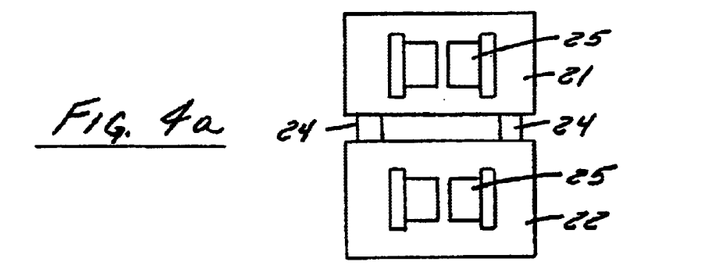
FIGS. 4a to 4d show a schematic plan view of different embodiments of a ground-compaction system in accordance with the invention.

FIG. 4a illustrates a ground-compaction system in accordance with the invention having two vibration plates 21, 22 which are connected together by means of connection elements 24.

Each of the vibration plates 21, 22 supports an oscillation excitation device 25, as already explained in conjunction with FIGS. 3a to 3e.

The connection structure connects the vibration plates 21, 22 to the connection elements 24 in a suitable manner such that the vibration plates 21, 22 are not able to rotate with respect to each other, but are kept in their respective direction. However, relative mobility is possible and expedient for the purpose of compensating for any ground unevenness and for the unnecessary synchronisation of the oscillation of the vibration plates.

The oscillation excitation devices 25 on each of the vibration plates 21, 22 serve at the same time as the drive for generating a propulsive movement. However, it is fundamentally possible to separate the function of the oscillation excitation device from the drive. As already described above, in the case of a known dual-shaft oscillation exciter it is possible to generate a considerable vertical oscillation, without effecting a propulsive movement, if the resulting force vectors are perpendicular (cf. e.g. FIG. 2a-4).

Figure 4B:
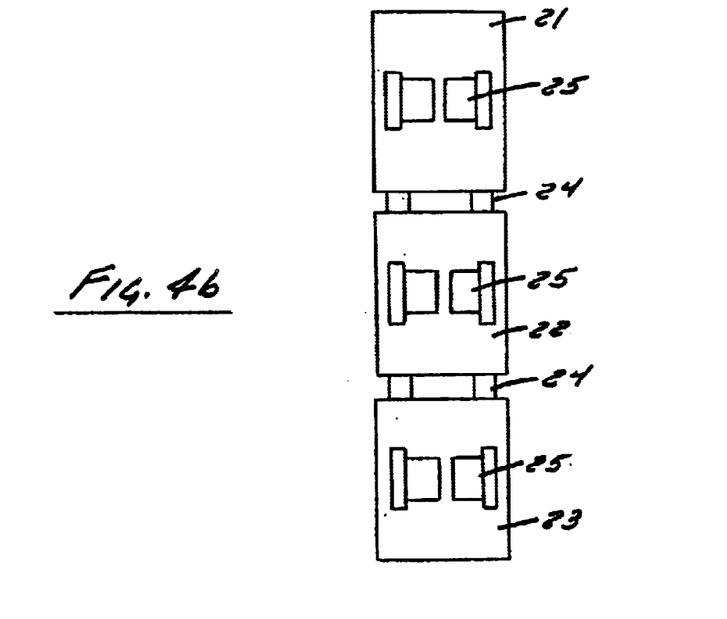

FIG. 4b shows three vibration plates 21, 22, 23 which are disposed in parallel with each other and which are likewise connected together in each case by means of the connection elements 24 and each support an oscillation excitation device 25.

Figure 4C:
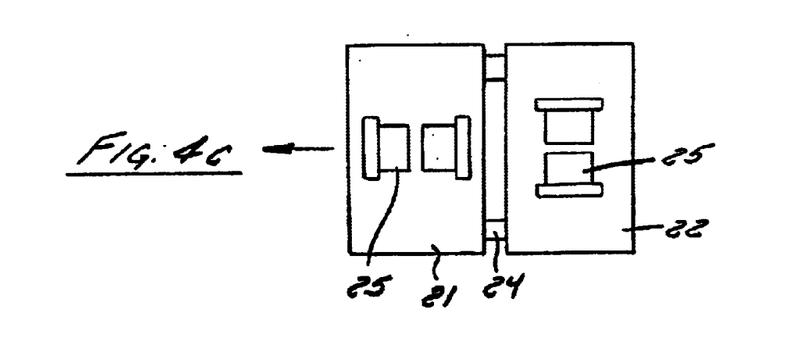

FIG. 4c shows two vibration plates 21, 22, on which is attached in each case an oscillation excitation device 25, wherein the direction of propulsion of the two oscillation excitation devices 25 is, however, rotated about 90° with respect to each other.

The oscillation exciter systems of the vibration plates can be operated without any synchronisation or in synchronism with each other. One of the vibration plates 21 serves to generate the propulsion of the entire ground-compaction system, whereas the second vibration plate 22 is used for directional control as well as ground-compaction purposes. In the event of undisrupted directional stability (arrow direction), the resulting force vector of the vibration plate 22 provided for directional control purposes is directed in a perpendicular manner with respect to the plane or is directed oscillating to the left and the right in a controlled manner, in order to introduce e.g. thrust stresses into the material to be compacted.

Figure 4D:
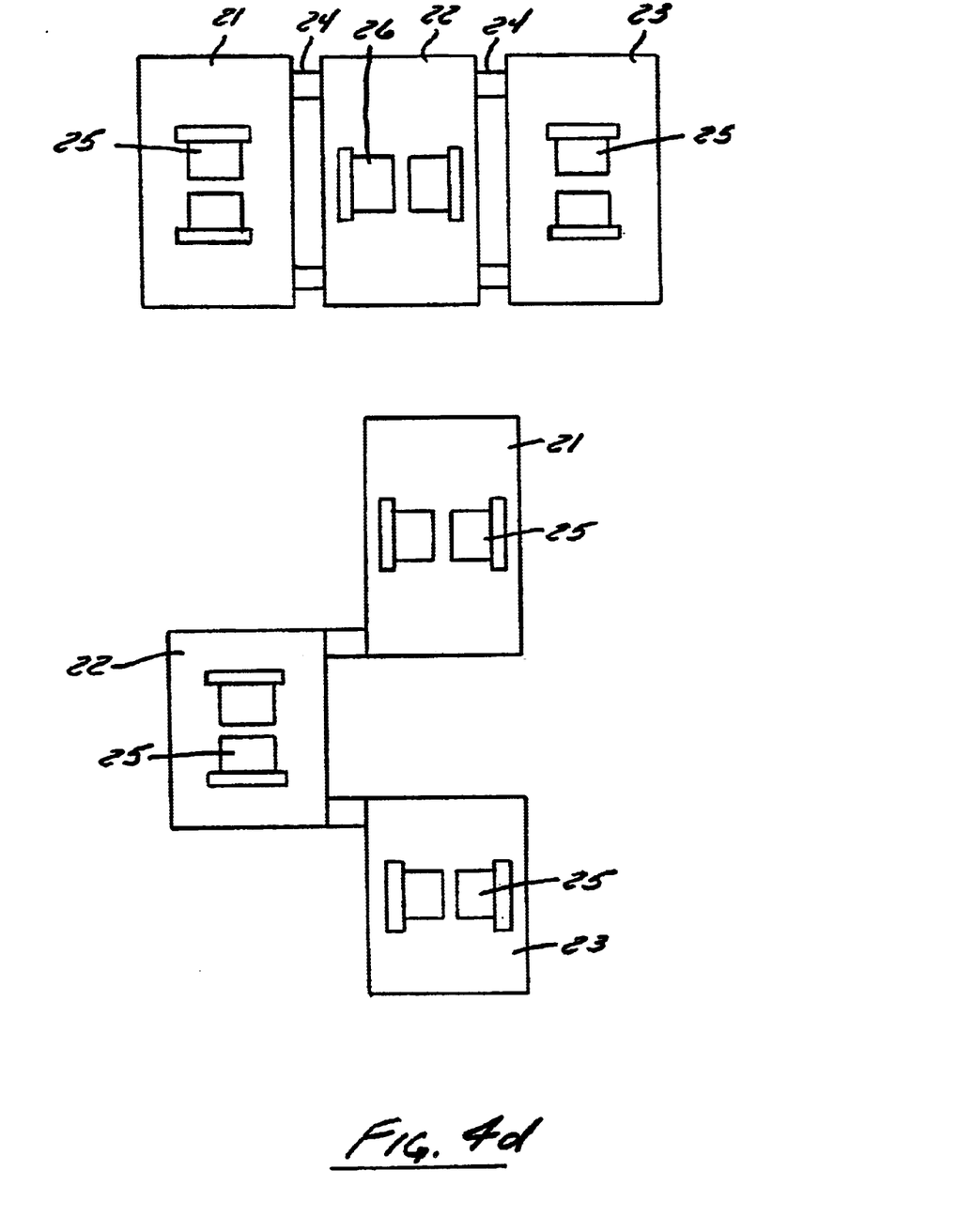

FIG. 4d shows arrangements of three vibration plates 21, 22, 23 which are coupled together, wherein in each case one oscillation excitation device 26 is disposed rotated about 90° with respect to the other oscillation excitation devices 25.

As in the case of the ground-compaction device described with respect to FIG. 3d, it is also possible in this case to achieve a parallel displacement of the entire system by reason of the direction of propulsion of the oscillation excitation devices 25 which is rotated about 90°.

As in the case of the oscillation excitation devices as shown in FIGS. 3a to 3e and in contrast to the ground-compaction device described with reference to FIGS. 1 and 2, it is not required in the vibration plates 21, 22, 23 of the ground-compaction systems shown in FIGS. 4a to 4d for a dedicated steering device—e.g. by means of two unbalanced masses disposed in an axial manner with respect to each other on one shaft—to be incorporated in the respective vibration plates 21, 22, 23. On the contrary, it is sufficient that the respective oscillation excitation device comprises the already described two shafts 14, 15 which can be rotated in opposite directions in a synchronised manner and each support an unbalanced mass, of which the phase position can be adjusted. Particularly when using three vibration plates, as shown in FIGS. 4b and 4d, it is even possible that in the case of the oscillation excitation device of the middle vibration plate not even the phase position needs to be adjustable.

The co-ordination of the oscillation exciters in the vibration plates is understandably extremely complex. For this reason, the ground-compaction system is provided with a movement detection device as in the case of the ground-compaction device described with reference to FIG. 1. The movement detection device, e.g. a yawing rate sensor or a different device already described above, detects an actual value of the travel movement of the entire ground-compaction system.

In a travel control device also provided, the actual value is compared with a desired value which is specified by the operator via the remote-control. The travel control device controls any control deviations by actuating the respective oscillation exciters in the vibration plates. For this purpose, the travel control device has algorithms stored in it which permit an unequivocal allocation of the steering functions.

As is already the case with the individual ground-compaction device, it is also possible in the ground-compaction system to compensate immediately for disruptions in the travel movement which are caused by ground unevenness or the like. For this purpose, the travel control device only has to adjust a suitable oscillation exciter of the vibration plates for a short period, in order to instigate a corrective movement.

In contrast to individual ground-compaction devices, the ground-compaction system has the advantage that the associated vibration plates can be constructed in a very convenient manner, since they do not require a dedicated steering device. It is only necessary to adjust the direction of the resulting force vector. Alternatively, several vibration plates—more than the two or three vibration plates shown in FIG. 4—can be combined to form one large unit having a corresponding level of working power. Moreover, by means of a suitable arrangement and actuation, it is possible to displace the ground-compaction system in parallel with the main direction of travel. This is particularly advantageous for automating compaction processes.

What is claimed is:

1. A driveable ground-compaction device, comprising:
   a drive for the generation of a propulsive movement;
   a steering device for the generation of a yawing moment about a vertical axis of the ground-compaction device;
   a travel transmitter to enable a desired value for a travel movement of the ground-compaction device to be specified by an operator;
   a movement detection device for the purpose of detecting an actual value of the travel movement; and having
   a travel control device, which can be influenced by the actual value and the desired value, for the purpose of actuating the steering device and/or the drive so as to minimize a control deviation which is formed by the difference between the actual value and the desired value.

2. Ground-compaction device as claimed in claim 1, wherein the travel movement includes a direction of travel, an alignment, a course over the ground, a rotational rate and/or a travel speed, and wherein the travel transmitter serves to specify a desired value for the direction of travel, the alignment, the course over the ground, the rotational rate and/or the travel speed.

3. Ground-compaction device as claimed in claim 1, wherein the travel movement includes a yawing rate about the vertical axis, and wherein the desired value is a desired yawing rate value.

4. Ground-compaction device as claimed in any of claim 1, wherein the travel control device actuates the steering device and/or the drive in such a manner that the ground-compaction device moves progressively at maximum travel speed with minimal control deviation.

5. Ground-compaction device as claimed in claim 1, wherein the movement detection device comprises a yawing rate sensor, a gyro compass, an optical fiber gyroscope, an earth's magnetic field sensor, a GPS-receiver, an acceleration sensor or a combination of these devices.

6. Ground-compaction device as claimed in claim 1, wherein the drive comprises at least one oscillation excitation device, having two mutually parallel shafts which can be rotated in opposite directions which each support at least one unbalanced mass and whose phase position can be adjusted.

7. Ground-compaction device as claimed in claim 6, wherein two unbalanced masses are disposed in an axially offset manner on at least one shaft of the oscillation excitation device, and wherein the steering device is formed for the purpose of adjusting the phase position of the two unbalanced masses.

8. Ground-compaction device as claimed in claim 1, wherein the drive and the steering device are formed by an arrangement of several oscillation excitation devices which are supported in a positionally fixed manner with respect to each other, wherein the oscillation excitation devices each comprise two mutually parallel shafts which can be rotated in opposite directions, which each comprise an unbalanced mass and whose phase position can be adjusted, and wherein in each case by virtue of one of the oscillation excitation devices a propulsive movement can be generated in each case into a direction of propulsion.

9. Ground-compaction device as claimed in claim 8, wherein the directions of propulsion of the oscillation excitation devices are substantially identical.

10. Ground-compaction device as claimed in claim 8, wherein the direction of propulsion of at least one of the oscillation excitation devices deviates from the directions of propulsion of the others.

11. Ground-compaction device as claimed in claim 8, wherein at least one oscillation excitation device is provided which is not able to generate any propulsive movement.

12. Ground-compaction device as claimed in claim 8, wherein the oscillation excitation devices are disposed on a common ground-contact plate.

13. Ground-compaction device as claimed in claim 12, wherein the ground-contact plate comprises a substantially circular outline.

14. Ground-compaction device as claimed in claim 8, wherein two oscillation excitation devices which have different directions of propulsion are disposed one above the other.

15. Ground-compaction device as claimed in claim 14, wherein a resulting force vector which is generated by the oscillation excitation devices is effective in the center of gravity of the ground-compaction device.

16. A ground-compaction system, having several driveable, mutually connected ground-compaction devices, wherein
   at least one of the ground-compaction devices comprises a drive for the generation of a propulsive movement into a direction of propulsion, and comprises an oscillation excitation device;
   the drive can be switched on and off;
   a travel transmitter is provided to enable a desired value for a travel movement of the entire ground-compaction system to be specified by an operator;
   a movement detection device is provided for the purpose of detecting an actual value for the travel movement; and wherein
   a travel control device which can be influenced by the actual value and the desired value is provided for the purpose of actuating the individual drives so as to minimize a control deviation which is formed by the difference between the actual value and the desired value.

17. Ground-compaction system as claimed in claim 16, wherein the ground-compaction devices are connected together in a directionally stable manner or in such a way as to be able to move with multiple degrees of freedom or are connected together elastically and/or in such a manner as to be height-adjustable relative to each other.

18. Ground-compaction system as claimed in claim 16, wherein the travel movement includes a direction of travel, an alignment, a course over the ground, a rotational rate and/or a travel speed, and wherein the travel transmitter serves to specify a desired value for the direction of travel, the alignment, the course over the ground, the rotational rate and/or the travel speed of the ground-compaction system.

19. Ground-compaction system as claimed in claim 16, wherein the direction of propulsion of at least one of the ground-compaction devices differs from the direction of propulsion of at least one other ground-compaction device.

20. Ground-compaction system as claimed in claim 19, wherein the direction of propulsion of the least one ground-compaction device is perpendicular to the direction of propulsion of the other ground-compaction device.

21. Ground-compaction system as claimed in claim 16, wherein the oscillation excitation device forms part of the drive.

22. Ground-compaction device as claimed in claim 1 or ground-compaction system as claimed in claim 16, wherein the travel transmitter is a component of a remote-control.

* * * * *